US009489924B2

(12) United States Patent
Schulze et al.

(10) Patent No.: US 9,489,924 B2
(45) Date of Patent: Nov. 8, 2016

(54) BOOT DISPLAY DEVICE DETECTION AND SELECTION TECHNIQUES IN MULTI-GPU DEVICES

(71) Applicant: NVIDIA Corporation, Santa Clara, CA (US)

(72) Inventors: Hans Wolfgang Schulze, Sunnyvale, CA (US); Ryan Speiser, West Bend, WI (US); Erik Zuroski, Mountain View, CA (US); Samuel Duell, San Jose, CA (US); James Van Veghel, Menlo Park, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 36 days.

(21) Appl. No.: 13/866,996

(22) Filed: Apr. 19, 2013

(65) Prior Publication Data

US 2014/0132612 A1 May 15, 2014

Related U.S. Application Data

(60) Provisional application No. 61/635,840, filed on Apr. 19, 2012.

(51) Int. Cl.
*G06F 15/16* (2006.01)
*G06F 15/00* (2006.01)
(Continued)

(52) U.S. Cl.
CPC ........ *G09G 5/363* (2013.01); *G09G 2330/026* (2013.01); *G09G 2360/06* (2013.01); *G09G 2370/22* (2013.01)

(58) Field of Classification Search
None
See application file for complete search history.

(56) References Cited

U.S. PATENT DOCUMENTS 5,457,748 A 10/1995 Bergum et al.
6,046,676 A 4/2000 Ward et al.
(Continued)

FOREIGN PATENT DOCUMENTS

JP 2004530235 9/2004
JP 2005122733 5/2005
(Continued)

OTHER PUBLICATIONS

Yano Koshio, et al. Hardware-Dependent Software-Role of Firmware Study Bootloader from CPU Mechanism/Design of BIOS, Interface, Japan, CQ Publishing Co., Ltd., Jan. 1, 2008, vol. 34, No. 1, p. 95-p. 104.

(Continued)

*Primary Examiner* — Jacinta M Crawford

(57) ABSTRACT

Techniques for selecting a boot display device in the multi-GPU configured computing device include a graphic initialization routine for determining a topology of a plurality of GPUs. It is then determined if a display is coupled to any of the plurality of GPUs. The determination of whether the display is coupled to a GPU is communicated to the other of the plurality of GPUs based upon the determined topology. Thereafter, selection of a given GPU as a primary boot device, by a system initialization routine, is influenced by representing each GPU not coupled to the display as a graphics device and the GPUs coupled to a given display as the primary boot device if one or more displays are coupled to GPUs, and by representing the given GPU as the primary boot device and all other GPUs as graphics devices when the display is not coupled to any of the GPUs. In addition or in the alternative selection of the given GPU as the primary boot device may be influenced by hiding the expansion ROM of GPUs not coupled to a display.

19 Claims, 3 Drawing Sheets

(51) Int. Cl.
*G06T 1/00* (2006.01)
*G09G 5/36* (2006.01)

(56) References Cited

U.S. PATENT DOCUMENTS

| | | | | |
|---|---|---|---|---|
| 6,185,678 | B1 | 2/2001 | Arbaugh et al. | |
| 7,430,585 | B2 | 9/2008 | Sibert | |
| 7,774,596 | B2 | 8/2010 | Flynn | |
| 8,203,557 | B2 * | 6/2012 | Shah et al. | 345/420 |
| 8,243,082 | B1 * | 8/2012 | Wyatt et al. | 345/502 |
| 8,373,707 | B1 * | 2/2013 | Wyatt et al. | 345/502 |
| 8,558,839 | B1 * | 10/2013 | Wyatt | 345/502 |
| 8,719,585 | B2 | 5/2014 | Grigor et al. | |
| 9,069,706 | B2 | 6/2015 | Sriram et al. | |
| 9,158,896 | B2 | 10/2015 | Cox et al. | |
| 2001/0011347 | A1 | 8/2001 | Narayanaswamy et al. | |
| 2003/0023822 | A1 | 1/2003 | Scott et al. | |
| 2003/0056107 | A1 | 3/2003 | Cammack et al. | |
| 2003/0084337 | A1 | 5/2003 | Simionescu et al. | |
| 2003/0095664 | A1 | 5/2003 | Asano et al. | |
| 2003/0115471 | A1 | 6/2003 | Skeba | |
| 2003/0177373 | A1 | 9/2003 | Moyer et al. | |
| 2004/0193873 | A1 | 9/2004 | England | |
| 2005/0132229 | A1 | 6/2005 | Zhang et al. | |
| 2005/0232415 | A1 | 10/2005 | Little et al. | |
| 2005/0283601 | A1 | 12/2005 | Tahan | |
| 2005/0289067 | A1 | 12/2005 | Lampson et al. | |
| 2006/0002561 | A1 | 1/2006 | Choi et al. | |
| 2006/0136748 | A1 | 6/2006 | Bade et al. | |
| 2006/0174109 | A1 | 8/2006 | Flynn | |
| 2006/0174240 | A1 | 8/2006 | Flynn | |
| 2006/0179308 | A1 | 8/2006 | Morgan et al. | |
| 2007/0027988 | A1 | 2/2007 | Lavin et al. | |
| 2007/0055881 | A1 | 3/2007 | Fuchs et al. | |
| 2007/0083744 | A1 | 4/2007 | Seok | |
| 2007/0124409 | A1 | 5/2007 | Sibert | |
| 2007/0169098 | A1 | 7/2007 | Kikuchi | |
| 2007/0198851 | A1 | 8/2007 | Goto | |
| 2007/0217614 | A1 | 9/2007 | Fujiwara et al. | |
| 2007/0234130 | A1 | 10/2007 | Sullivan et al. | |
| 2007/0268296 | A1 * | 11/2007 | Ledebohm et al. | 345/501 |
| 2007/0300207 | A1 | 12/2007 | Booth et al. | |
| 2008/0040598 | A1 | 2/2008 | Lee et al. | |
| 2008/0077973 | A1 | 3/2008 | Zimmer et al. | |
| 2008/0082680 | A1 | 4/2008 | Grewal et al. | |
| 2008/0086630 | A1 | 4/2008 | Rodgers et al. | |
| 2008/0086652 | A1 | 4/2008 | Krieger et al. | |
| 2008/0114994 | A1 | 5/2008 | Iyer et al. | |
| 2008/0137848 | A1 | 6/2008 | Kocher et al. | |
| 2008/0165952 | A1 | 7/2008 | Smith et al. | |
| 2008/0256595 | A1 | 10/2008 | Schunter et al. | |
| 2009/0205053 | A1 | 8/2009 | Sriram et al. | |
| 2009/0259854 | A1 | 10/2009 | Cox | |
| 2010/0138668 | A1 | 6/2010 | Tsuria et al. | |
| 2010/0185845 | A1 | 7/2010 | Takayama et al. | |
| 2010/0302141 | A1 * | 12/2010 | Shankar et al. | 345/156 |
| 2011/0060924 | A1 * | 3/2011 | Khodorkovsky | 713/300 |

FOREIGN PATENT DOCUMENTS

| | | | |
|---|---|---|---|
| WO | 2006086301 | A1 | 8/2006 |
| WO | 2008009112 | A1 | 1/2008 |

OTHER PUBLICATIONS

Wuhan University Journal of Natural Sciences, vol. 11 (Nov.), No. 6, pp. 1449-1452, “Design and implementation of a bootstrap trust chain”, Yu Fajiang & Zhang Huanguo; INSPEC association No. 9445762.

* cited by examiner

BOOT DISPLAY DEVICE DETECTION AND SELECTION TECHNIQUES IN MULTI-GPU DEVICES

CROSS-REFERENCE TO RELATED APPLICATIONS

This application claims the benefit of U.S. Provisional Patent Application No. 61/635,840 filed Apr. 19, 2012.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the display subsystem and the graphics processing subsystem that renders images on the display subsystem. When a computing device is started, a boot process is performed to initialize the various subsystems, including the display and graphics processing subsystems. The boot process typically starts with execution of a power on self-test (POST) routine and ends with loading and execution of the operating system (OS).

The boot display device is the GPU device that drives a display during the boot process until the OS display driver assumes control. The boot display device, also referred to as the primary display device, is selected by the System BIOS (SBIOS). In standard desktop systems, and most other systems, the system BIOS must decide which boot display device to initialize, without knowledge of which device has a display connected. Deciding which boot device to initialize without knowledge of which device has a display connected to it can result in no display until the OS display driver assumes control. Accordingly, there is a continuing need for an improved boot process.

SUMMARY OF THE INVENTION

The present technology may best be understood by referring to the following description and accompanying drawings that are used to illustrate embodiments of the present technology directed toward selecting a boot display device detection and selection in the multi-GPU configured computing device.

In one embodiment, the computing device includes a Central Processing Unit (CPU) and a plurality of GPUs communicatively coupled together. At least some GPUs are communicatively coupled together in a non-integrated and non-predetermined configuration. A default GPU executing the graphics initialization routine determines a topology of the plurality of GPUs. The default GPU also determines if the master GPU is coupled to a monitor. The default GPU also communicates the determination of whether the master GPU is coupled to the monitor to the other of the plurality of GPUs based upon the determined topology. The default GPU also influences the selection of the master GPU as a primary boot device. The default GPU may be determined by a possible pre-determined system-specific search order. Similarly, the other GPUs executing graphics initialization routine determine the topology of the plurality of GPUs. The other GPUs also determine if the respective GPU is coupled to the monitor. The other GPUs also communicate the determination of whether the respective GPU is coupled to the monitor to the other of the plurality of GPUs based upon the determined topology. The other GPUs also influence the selection of the respective GPU as the primary boot device. If the display is attached to the default GPU or if no display is attached to any of the GPUs, the graphics initialization routines influence the system initialization routine to select the default GPU as the primary boot device. If one or more displays are attached to GPUs other than the default GPU, the graphics initialization routines influence the system initialization routine to select a given GPU having a desired display attached as the primary boot device.

In another embodiment, the method of selecting a primary boot device in the multi-GPU configured computing device includes determining a topology of a plurality of Graphics Processing Units (GPUs) communicatively coupled together in a non-integrated and non-predetermined configuration. It is also determined if a display is coupled to any GPU. The determination of whether a display is coupled to a GPU is communicative to the other of the plurality of GPUs based upon the determined topology. Thereafter, selection of a given GPU as a primary boot device is influenced by representing each GPU not coupled to the display as a graphics device, and the given GPU coupled to the display as the primary boot device if the display is coupled to the given device. In addition, selection of a given GPU as a primary boot device is influenced by representing the given GPU as the primary boot device and all other GPUs as graphics devices, when the display is not coupled to any of the GPUs. The selection of a given GPU as the primary boot device may also be influenced by hiding the expansion ROM contents of the GPUs not coupled to the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
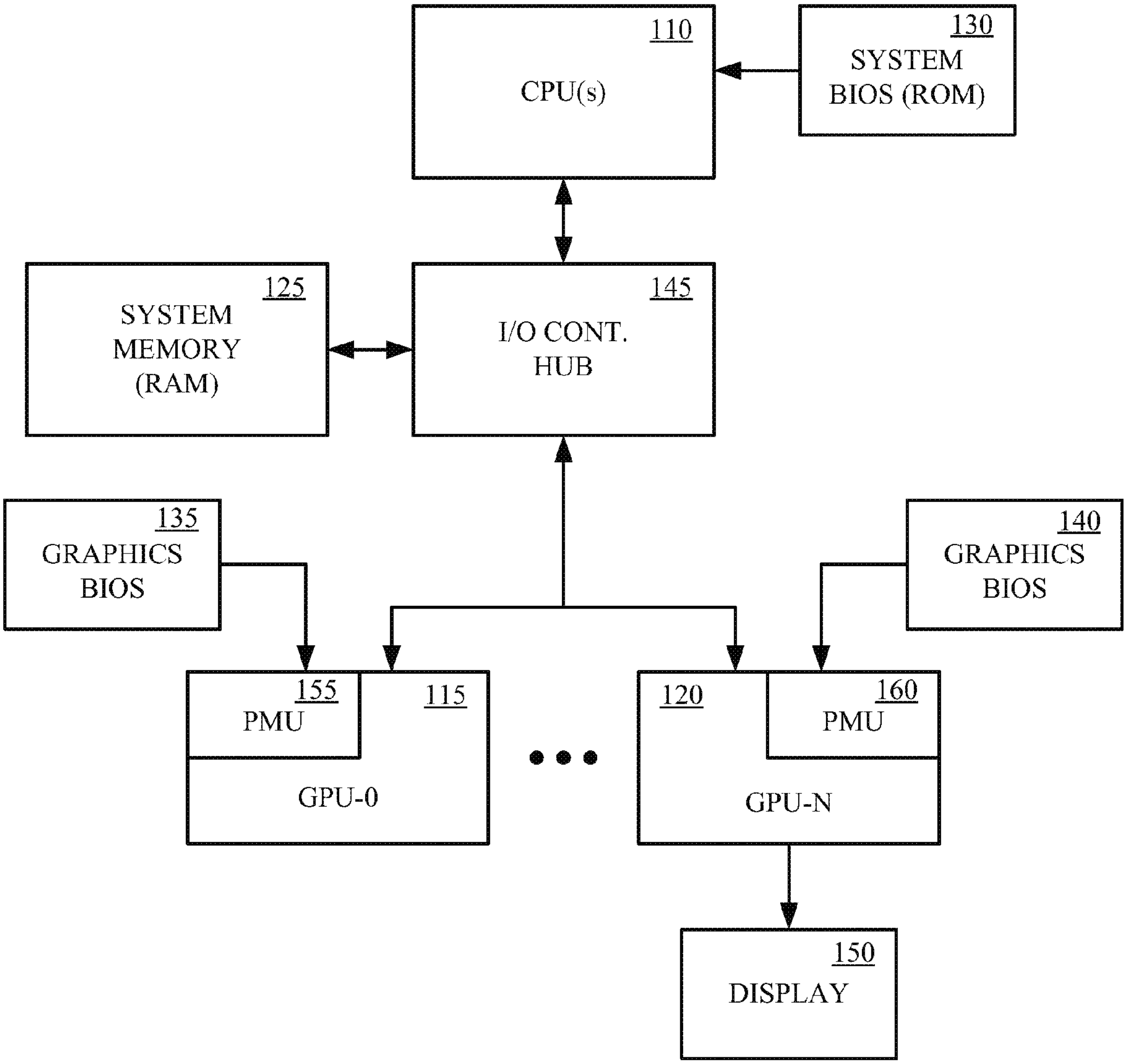
FIG. 1 shows a block diagram of a multi-GPU configured computing device in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device. Signals may be sent and/or received by software in a number of steps to convey a signal to a target using an arbitrarily complex route or list of steps. Likewise, an electronic way of signaling could be a pulse, a series of pulses, a change in logic level or a change in voltage or current.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, a computing device in accordance with one embodiment of the present technology is shown. The computing device includes one or more central processing units (CPU) 110, a plurality of graphics processing units (GPU) 115,120, and one or more computing device readable media (e.g., memory) 125-140 communicatively coupled together by an input/output controller hub (e.g., northbridge, southbridge) 145 and one or more buses. One or more monitors 150 may be communicatively coupled to the GPUs 115, 120. However, there may also be no monitor coupled to the GPUs 115,120.

The one or more computing device readable media 125-140 typically includes read only memory (ROM) for storing one or more initialization routines such as system basic input/output system (BIOS). The one or more computing device readable media typically also includes system memory 125 for storing the operating system, one or more user applications, and data. The computing device may also include numerous other subsystems and/or peripherals such as hard disk drives, optical disk drives, keyboards, pointing device, speakers, and/or the like. There additional subsystems and/or peripherals are well know in the art and are not germane to an understanding of embodiments of the present technology. Therefore, such additional subsystems and/or peripheral will not be discussed further so as not to unnecessarily obscure embodiments of the present technology.

The plurality of GPUs are communicatively coupled together, wherein one or more GPUs are arranged in a non-integrated and non-predetermined configuration with respect to other GPUs. For example, a user may install two graphics cards, that each have a pair of GPUs. The pair of GPUs on each graphics card are coupled together in an integrated and predetermined configuration. However, the cards are designed to stand alone or be coupled to one or more other graphics cards by one or more communication busses. The user may, for example, communicatively couple the cards together in a non-integrated and non-predetermined configuration by coupling each to the graphics cards by a Peripheral Component Interface Express (PCI-E) buss and also by communicatively coupling the cards together by a Scalable Link Interface (SLI) or other interface. In another example, the user may install three, four or more graphics cards together in a chain, ring, or the like SLI configuration.

The one or more CPUs 110 start executing one or more system initialization routines, such as system basic input/output system (BIOS) 130, and/or the like. The one or more system initialization routines configure the state of the processor, input/output controller bus, and the like to prepare for reliable execution of the operating system and user applications. In addition, each GPU typically executes one or more graphics initialization routines, such as graphics BIOS implemented in firmware in the GPU or stored in a computing device readable media, such as a GPU specific ROM 135, 140. The one or more graphics initialization routines may be executed by one or more function blocks of the GPU to configure the state of the respective GPU. For instance, during execution of an initial portion of the system initialization routine by the one or more CPUs, a subsystem reset signal is sent from the one or more CPUs 110 to each of the plurality of GPUs. In response to the subsystem reset, an embedded controller, such as a programmable management unit (PMU) 145, 160 within each GPU starts executing a respective graphics BIOS to initialize each GPU. In other embodiments, the initialization of the GPUs may be performed by dedicated hardware, firmware, software or any combination thereof depending upon the performance needs.

During execution, the system initialization routine writes various data to a primary boot device for display to a user. In one implementation, the primary boot device may be a Video Graphics Array (VGA) boot device. In another implementation, the primary boot device may be a Unified Extensible Firmware Interface (UEFI) display boot device. For proper operation, the plurality of GPUs should indicate, to the I/O control hub and/or processor, which GPU is the primary boot device. The primary boot device should be a given GPU having a display communicatively coupled to it if there is a single display. If there is more than one display communicatively coupled to the GPUs, the GPU attached to a given display should be the primary boot device. The given display may be based upon one or more parameters of the display, such as resolution, size or the like. If there is no display attached to any of the GPUs, a given GPU should be by default the primary boot device.

Figure 2A:
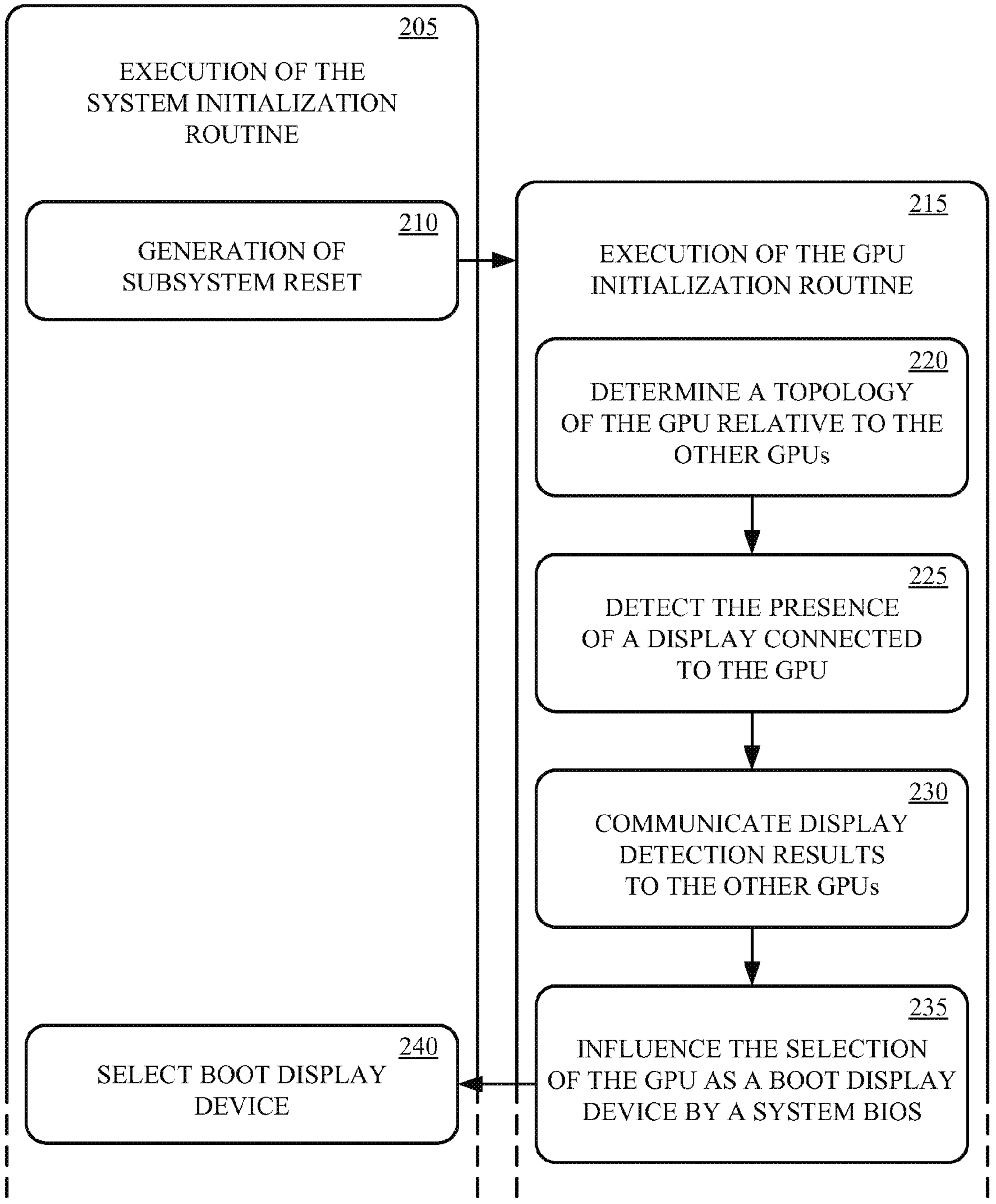
FIGS. 2A and 2B show a flow diagram of a method of selecting a primary boot device in the multi-GPU configured computing device, in accordance with one embodiment of the present technology.
Figure 2B:
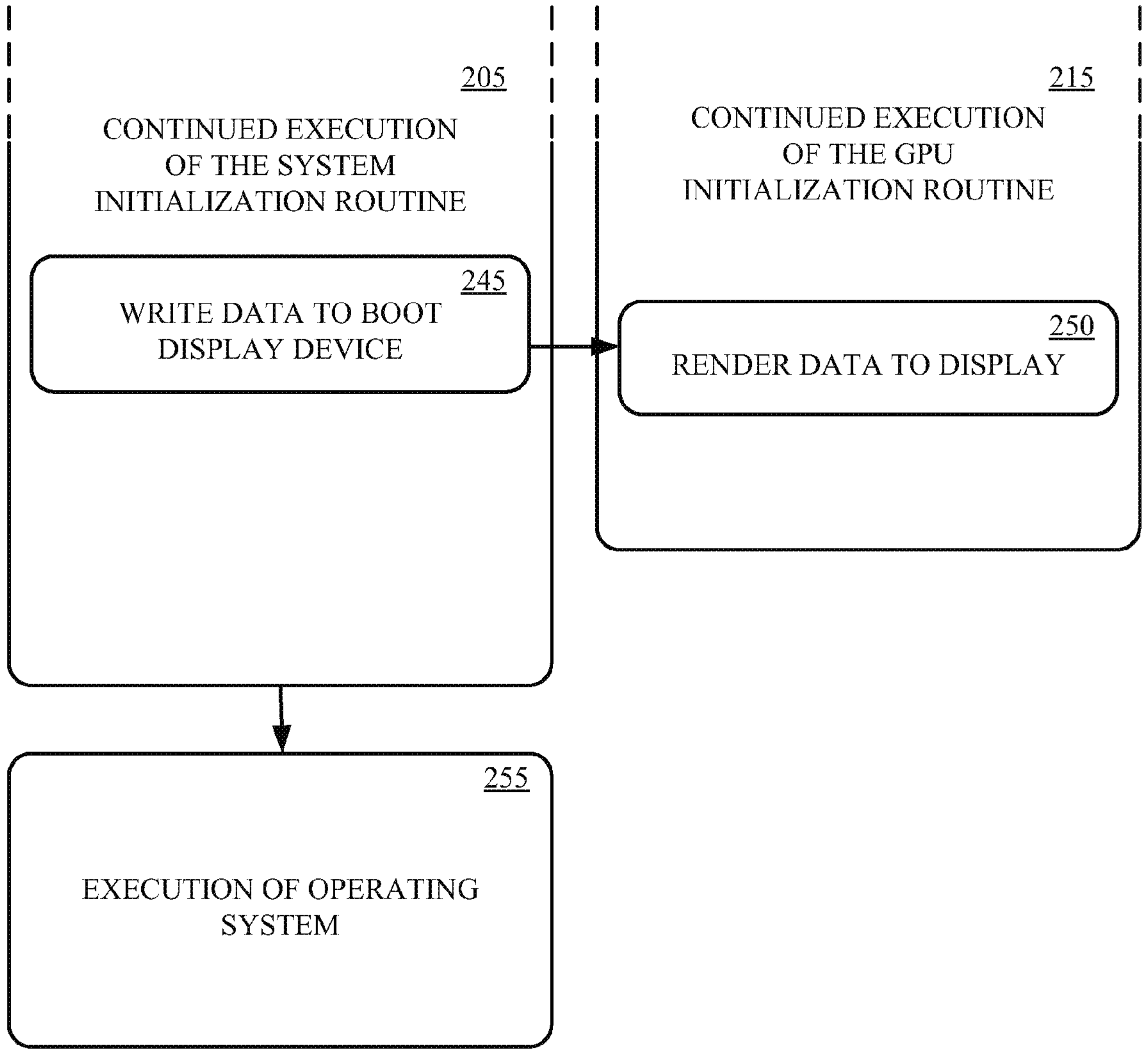

Operation of the computing device will be further explained with reference to FIG. 2, which shows a method of selecting a primary boot device in the multi-GPU configured device. The method may be implemented as one or more sets of computing device-executable instructions (e.g., computer programs) that are stored in computing device-readable media (e.g., computer memory) and executed by one or more processing units (e.g., CPU, GPU). The method begins with execution of the system initialization routine, at 205. The system initialization routine configures the state of the processor, input/output controller bus, and the like, to prepare for reliable execution of the operating system and user applications. The system initialization routine, in one implementation, may be a system basic input/output system (BIOS). In one implementation, the one or more CPUs start executing the system BIOS in response to a reset event (e.g., power up, reboot).

Shortly after the system initialization routine starts executing on one or more CPUs, a graphics initialization routine starts executing on each GPU, at 215. The graphics initialization routine executed by each GPU configures the state of the respective GPU to prepare for reliable execution. The graphics initialization routine, in one implementation, may be a graphics BIOS. The graphics initialization routine is completed within a specified time limit while the system initialization routine is being executed.

Execution of the system initialization routine by one or more CPUs and execution of the graphics initialization routine by the GPUs includes numerous process well know to those skilled in the art that are not discussed in detail herein. Only those portions of system initialization routine and graphics initialization routines that are germane to embodiments of the present technology are discussed.

In one implementation, the graphics BIOS starts executing in response to generation of a subsystem reset by the system BIOS. In one implementation, an embedded controller, such as a programmable management unit (PMU) 155, 160, within each GPU 115, 120 starts executing a respective graphics BIOS 135, 140 to initialize each GPU 115, 120. In one implementation, the PMU 155, 160 is boot-strapped by Initialize-From-ROM (IFR), which is a hardware engine that can perform basic GPU initialization using data from a firmware ROM. IFR executes after release of reset and in this case loads a PMU code image (e.g., graphics BIOS 135, 140) and starts execution thereof by the PMU 155, 160.

During execution of the graphics initialization routine, a topology of the communicative coupling of the plurality of GPUs is determined at 220. In one implementation, the graphics initialization routine executed by the respective PMU of each GPU determines the communicative topology of the given GPU relative to the other GPUs. In one implementation, the graphics initialization routines may designate a particular GPU or GPU card as the default. The default may be designated based upon the determined topology. Typically, PCI rules dictate that the lowest numbered eligible display device should be the default boot device. However, not all manufactures follow this rule.

During execution of the graphics initialization routine, the presence of one or more displays is also detected, at 225. In one implementation, the graphics initialization routine executed by the respective PMU of each GPU determines if a display is coupled to the given GPU. For example, the code executing on the PMU 155, 160 may use General Purpose Input/Outputs (GPIO) to determine if any hot plug detect signals are asserted. If any hot plug signals are asserted, a display is present. In another example, a hardware 12C controller may be utilize to attempt to read a DDC-EDID from display connections that do not support hot plug. If an acknowledgement is received from DDC address 0xA0, then a display is connected. If the display is a plug-n-play device, the GPU initialization routine detects if there is a voltage on a predetermined input. If a voltage is on the predetermined input, a display is coupled to the given GPU. If a voltage is not present on the predetermined input, than a display is not coupled to the given GPU. In another implementation, the GPU generates a potential on a given DAC line. A display provides a resistive load on the DAC line that causes a potential to be below a certain value if the display is attached.

At 230, the display detection results are communicated between the GPUs. In one implementation, the PMU of each GPU communicates the display detection results of the given GPU to each of the other GPUs via an inter-GPU communication link such as SLI. The use of the SLI bridge or similar communication link enables embodiments to be extended to any set of GPUs in a give configuration even if not on the same physical add-in Printed Circuit Board (PCB). The term 'inter-GPU communication link' as used herein refers to a communication link between the GPUs initialized by the GPU initialization routine, and therefore is not controlled by the system initialization routine and the one or more CPUs and/or I/O controller huh.

At 235, the graphics initialization routine executing on the GPUs influence the selection of a given GPU as a primary boot device based on the results of the display detection. The selection of a given GPU as the primary boot device is influenced by the GPUs that do not have a display device attached representing themselves as not the primary boot device. However, in the event, that none of the GPUs have a display attached, a particular GPU, such as a default GPU, represents itself as the primary boot device while the other GPUs represent themselves as display device other than a primary boot device. In one implementation, a class code, other than VGA, may be used to indicate to the system BIOS that a given GPU should not be initialized as the primary boot device. In one implementation, the class code may be set to 0x03 to indicate that the GPU is a display controller, and the class code may be set to 0x02 (e.g., GPU is a 3D Graphics Controller) to indicate the GPU is not a VGA boot device. However, some system BIOS do not distinguish 3D class code from VGA class code. Therefore, the expansion ROM contents may additionally be "hidden," making it impossible for the system BIOS to initialize the device. In another implementation, ROM shadowing may be enabled, which redirects expansion ROM reads to the frame buffer memory, which is both un-initialized and disabled during system initialization. In other implementations, the selection of the primary boot device by the system BIOS may be influenced by altering the bootable ROM signature, checksums, cyclic redundancy check (CRC), pointers to initialization code, failure return codes from code execution, having no ROM footprint (e.g., RAM only), or the like. Accordingly, the system BIOS selection of the primary boot device is influenced by display devices that do not have a display attached to them, representing themselves as not being a bootable display device.

If there is a display attached to the default GPU, the system initialization routine should be influenced to select the default GPU as the primary boot device. The system initialization routine should also be influenced to select the default GPU as the primary boot device if there is not a display attached to any of the GPUs. If one or more displays are attached to GPUs other than the default GPU, than the system initialization routine should be influenced to select a respective GPU having a desired display attached thereto. Furthermore, in SLI mode there may be one or more displays attached that are not utilized in SLI mode. The system initialization routine does not want to boot to the one or more attached displays that the computer cannot render to in SLI mode.

In one implementation, when the subsystem reset is de-asserted, the embedded controller 155, 160 loads and executed a graphics initialization routines. In one implementation, GPU-0 115 is loaded with program and parameters identifying it as a respective other GPU and GPU-N 120 is loaded with program and parameters identifying it as the default GPU. The embedded controllers 115, 120 execute a display detect such that the GPU-0 115 waits for detection results from GPU-N 120, and GPU-N 120 detects an attached display 150. The embedded controllers 155, 160 communicate the detection results such that GPU-0 115 reads detection results sent from GPU-N 120. The embedded controllers 155, 160 change the class code of one or both of the GPUs 115, 120 and/or hide expansion ROMs 135, 140 of respective GPUs 115, 120 accordingly. For instance, if GPU-N detects a display, the embedded controller of GPU-0 changes display code of GPU-0 to 3D (e.g., 0x02) and hides GPU-0 's ROM. If GPU-N does not detect a display, the embedded controller of GPU-N changes display code of GPU-N to 3D and hides GPU-N's ROM. If none of the GPUs have a display attached, a default or the like GPU represents itself as a primary bootable device and the other GPUs represent themselves as not being bootable display devices.

At 240, the system initialization routine selects the primary boot device influenced by the GPU initialization routines. In order for the graphics initialization routine to influence selection of the primary boot device, the graphics initialization routine needs to be completed within a specified time limit. Thereafter, the system initialization routine may write data to the primary boot device, at 245. At 250, the data written by the system initialization routine to the primary boot device is rendered by the given GPU that represents itself as the primary boot device. The method may continue with various other processes performed by continued execution of the system initialization routine and continued execution of the GPU initialization routine leading to execution of the operating system, at 255.

Embodiments of the present technology advantageously specify the primary boot device dynamically, dependent on which GPU has a display connected. The embodiments of the present technology may be utilized to work around a system BIOS policy or may be utilized to implement a desired boot policy. Embodiments also advantageously need not cause modification to the PCI compliant system BIOS. Although the present technology was explained with reference to two GPUs, it is appreciated that it may be extended to any number of GPUs, GPU cores, and/or GPU cards each including one or more GPUs and/or GPU cores.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:

determining, by a respective graphics initialization routine, a topology of each or a respective one of a plurality of Graphics Processing Units (GPUs) communicatively coupled together in a non-integrated and non-predetermined configuration, before selection of a primary boot display device by a system initialization routine;

determining, by the respective graphics initialization routine, for each respective one of the plurality of GPUs if a display is coupled to any GPU, before selection of the primary boot display device by the system initialization routine;

communicating, by the respective graphics initialization routine, the determination of whether the display is coupled to a GPU to the other of the plurality of GPUs based upon the determined topology, before selection of the primary boot display device by the system initialization routine; and influencing, by the respective graphics initialization routine, selection, by the system initialization routine, of a given GPU as the primary boot display device by representing, by the respective graphics initialization routine, each respective GPU not coupled to the display as a graphics device and the given GPU coupled to the display as the primary boot display device if the display is coupled to the given device, and by representing the given GPU as the primary boot display device and all other GPUs as graphics devices when the display is not coupled to any of the GPUs.

2. The method according to claim 1, further comprising:

receiving data by the given graphics device as the primary boot display device from the system initialization routine;

rendering the data by the given graphics device on the display.

3. The method according to claim 1, wherein determining for each of the plurality of GPUs if a display is coupled to any GPU comprises determining if a hot plug signal is asserted on a General Purpose Input Output (GPIO) of the respective GPU.

4. The method according to claim 1, wherein determining for each of the plurality of GPUs if a display is coupled to any GPU comprises reading a DDC-EDID by the respective GPU.

5. The method according: to claim I, wherein the determination of whether the display is coupled to the GPU is communicated to the other of the plurality of GPUs by an inter-GPU communication link coupling the plurality of GPUs.

6. The method according to claim 1, wherein influencing selection of the given GPU as the primary boot display device comprises setting a class code of GPUs not coupled to the display to a three-dimensional (3D ) graphics controller.

7. The method according to claim 1, wherein influencing selection of the given GPU as the primary boot display device comprises hiding expansion Read-Only-Memory (ROM) of GPUs not coupled to the display.

8. One or more non-transitory computing device readable media storing one or more sets of computing device executable instructions comprising:

a system initialization routine for generating of a subsystem reset; and a graphic initialization routine, in response to the subsystem reset, for:

determining a topology of a plurality of Graphics Processing Units (GPUs) communicatively coupled together in a non-integrated and non-predetermined configuration, before selection of a primary boot display device by the system initialization routine;

determining if a display is coupled to any GPU of the plurality of GPUs, before selection of the primary boot display device by the system initialization routine;

communicating the determination of whether the display is coupled to a GPU to the other of the plurality of GPUs based upon the determined topology, before selection of the primary boot display device by the system initialization routine; and influencing selection, by the system initialization routine, of a given GPU as the primary boot display device by representing each GPU not coupled to the display as a graphics device and the GPUs coupled to a given display as the primary boot display device if one or more displays are coupled to GPUs, and by representing the given GPU as the primary boot display device and all other GPUs as graphics devices when the display is not coupled to any of the GPUs.

9. The one or more computing device readable media storing one or more sets of computing device executable instructions of claim 8, wherein the system initialization routine further includes writing data to the primary boot display device.

10. The one or more computing device readable media storing one or more sets of computing device executable instructions of claim 9, wherein the graphic initialization routine influences selection of the primary boot display device by the system initialization routine before the system initialization routine writes the data to the primary boot display device.

11. The one or more computing device readable media storing one or more sets of computing device executable instructions of claim 8, wherein determining if the display is coupled to any of the plurality of GPUs comprises:

selecting a default GPU as the primary boot display device if the display is attached to the default GPU or if no display is attached to any of the GPUs;

selecting a given other GPU having a desired display attached as the primary boot display device if one or more displays are attached to GPUs other than the default GPU.

12. The one or more computing device readable media storing one or more sets of computing device executable instructions of claim 8, wherein:

the graphics initialization routine comprises a graphics Basic Input Output System (BIOS); and the system initialization routine comprises a system BIOS.

13. The one or more computing device readable media storing one or more sets of computing device executable instructions of claim 8, wherein influencing selection of the given GPU as the primary boot display device comprises:

setting a class code of GPUs not coupled to the display to a three-dimensional (3D) graphics controller; and hiding expansion Read-Only-Memory (ROM) of GPUs not coupled to the display.

14. A system comprising:

a Central Processing Unit (CPU) executing a system initialization routine;

a plurality of Graphics Processing Units (GPUs) communicatively coupled together, each GPU includes a respective embedded controller, wherein at least some GPUs are communicatively coupled together in a non-integrated and non-predetermined configuration, including:

an embedded controller of a default GPU executing a graphics initialization routine to determine a topology of the plurality of GPUs, to determine if the default GPU is coupled to a display, to communicate the determination of whether the default GPU is coupled to the display to the other of the plurality of GPUs based upon the determined topology, and to influence the selection of the default GPU as a primary boot device by the system initialization routine before the system initialization routine looks at the plurality of GPUs to determine which is the primary boot device or starts writing information to the display; and each embedded controller of one or more other GPUs each executing a respective graphics initialization routine to determine the topology of the plurality of GPUs, to determine if the respective GPU is coupled to the display, to communicate the determination of whether the respective GPU is coupled to the monitor to the other of the plurality of GPUs based upon the determined topology, and to influence the selection of the respective GPU as the primary boot device by the system initialization routine before the system initialization looks at the plurality of GPUs to determine which is the primary boot device or starts writing information to the display.

15. The system of claim 14, wherein the embedded controller of each GPU comprises a Power Management Unit (PMU) boot-strapped by Initialize-From-ROM (IFR).

16. The system of claim 15, wherein:

the graphics initialization routine of each GPU comprises a graphics Basic Input Output System (BIOS); and the system initialization routine of the CPU comprises a system BIOS.

17. The system of claim 14, wherein in least two of the plurality of GPUs are communicatively coupled together by a Scalable Link. Interface (SLI).

18. The system of claim 14, wherein the primary boot device comprises a Video Graphics Array (VGA) boot device.

19. The system of claim 14, wherein the primary boot device comprises a Unified Extensible Firmware Interface (UEFI)boot display device.

* * * * *